(No Model.)
J. W. SHAW.
FURNACE GRATE.
No. 337,527. Patented Mar. 9, 1886.
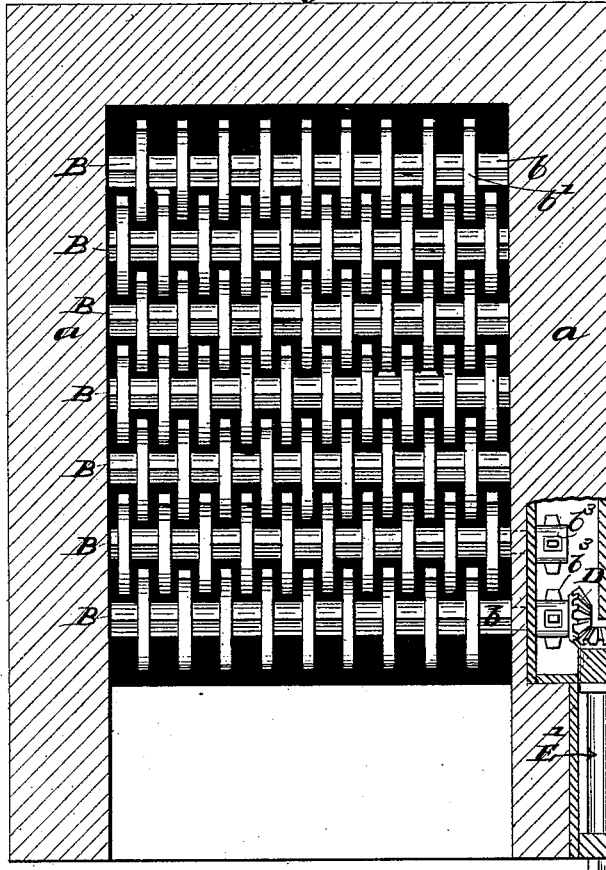
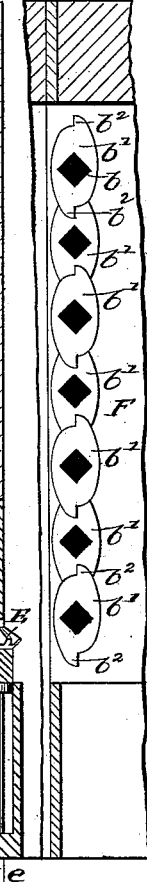
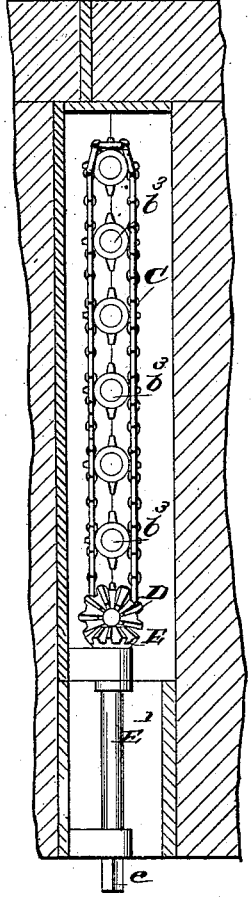
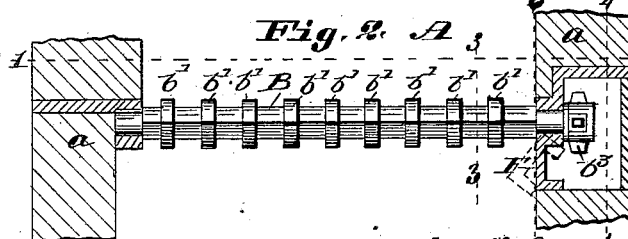
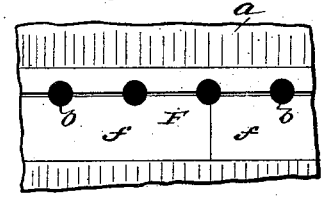
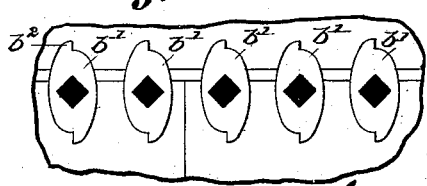
Attest:
Charles Pickles
C. E. Hunt
Inventor:
Joseph W. Shaw
by C. D. Moody
atty

UNITED STATES PATENT OFFICE.

JOSEPH W. SHAW, OF ST. LOUIS, MISSOURI.

FURNACE-GRATE.

SPECIFICATION forming part of Letters Patent No. 337,527, dated March 9, 1886.

Application filed October 3, 1884. Serial No. 144,673. (No model.)

*To all whom it may concern:*

Be it known that I, JOSEPH W. SHAW, of St. Louis, Missouri, have made a new and useful Improvement in Furnace-Grates, of which the following is a full, clear, and exact description, reference being had to the annexed drawings, making part of this specification, in which—

Figure 1 is a horizontal section on the line 1 1 of Fig. 2; Fig. 2, a vertical cross-section; Fig. 3, a vertical longitudinal section on the line 3 3 of Fig. 2; Fig. 4, a vertical longitudinal section on the line 4 4 of Fig. 2; Fig. 5, a view similar to Fig. 3, but showing the grate-bars turned to drop the ashes; and Fig. 6, a view from the inside of the furnace, and being a vertical longitudinal section on the line 6 6 of Fig. 2.

The same letters of reference denote the same parts.

The present invention is an improvement in that class of furnace-grates which have movable grate-bars.

A represents a furnace in which the present improvement is embodied.

B B B represent the grate-bars. They severally consist of a shaft, $b$, suitably journaled in the walls $a\,a$ of the furnace, and provided with a series of disks, $b'\,b'$, Figs. 1, 2, 3, 5. The grate-bars are constructed and relatively arranged so that the disks $b'$ interlap each other, substantially as shown in Fig. 1. The disks $b'$ are elongated in a horizontal direction, and at its ends the disk is extended to form or is provided with a shoulder or projection, $b^2$, the projections at the opposite ends of the disk facing in opposite directions—that is, the projection at one end of the disk faces upward, and the projection at the opposite end of the disk faces downward when the grate-bars are turned into position to support the fire, as in Figs. 1 and 3. The disks are attached to the shaft in any suitable manner. They may be cast in one piece with the shaft. The shafts $b$ are extended beyond their bearings in the wall $a$, and at their ends are respectively provided with sprocket-wheels $b^3$. A chain, C, extends around and engages with the series of sprocket-wheels $b^3$, substantially as shown in Fig. 4. One of the shafts $b$ is extended beyond the point where its sprocket-wheel is attached, and is provided with a bevel-gear, D, Figs. 1 and 4.

The bevel-gear E upon the shaft E' engages with the bevel-gear D. The shaft E' extends forward through the front of the furnace, or so that it can be reached and a crank applied thereto—say, to the portion $e$ of the shaft. By rotating the shaft E' rotary motion is imparted to the shaft $b$, and by means of the chain C and the sprocket-wheels $b^3\,b^3$ the several grate-bars constituting the grate are caused to rotate; and as the shafts rotate in the same direction, the adjoining shoulders or projections, $b^2$, of the disks $b'$ move in opposite directions. In consequence of this the clinkers and cinders are broken up, and are readily discharged through the grate. On turning the shaft so as to bring the grate-bars and disks $b'$ into the upright position shown in Fig. 5 ample space is provided between the disks so that the ashes can drop into the ash-box.

When it is desired to remove any of the grate-bars, the plate F, Fig. 2, is removed, as indicated by the dotted lines in Fig. 2, there being sufficient looseness of the parts for the purpose, whereupon the shafts $b$ drop down, and the grate-bars in consequence can be removed from their bearings and furnace-walls.

The plate F can be made in sections $f$, so that one, two, or more grate-bars can be removed at a time, and when but a section of the plate F is taken out of its place in the furnace-wall the chain C sags somewhat and sufficiently to allow of the bars in question being withdrawn.

When any of the grate-bars become warped in use, they can be reversed, for the disks $b'$ can be used either edge $b^4$ uppermost.

I claim—

The combination of the furnace A, the grate-bars B B, having the sprocket-wheels $b^3$, the chain C, the gears D E, and the shaft E', substantially as described.

JOSEPH W. SHAW.

Witnesses:
 CHAS. D. MOODY,
 CORA E. HUNT.